(12) United States Patent
Armato

(10) Patent No.: US 10,586,073 B1
(45) Date of Patent: Mar. 10, 2020

(54) PRESERVING CUSTOMER DATA PRIVACY FOR MERCHANT ORDERS

(71) Applicant: Amazon Technologies, Inc., Reno, NV (US)

(72) Inventor: Steven Simons Armato, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 1273 days.

(21) Appl. No.: 14/287,932

(22) Filed: May 27, 2014

(51) Int. Cl.
*G06F 21/62* (2013.01)
*G06Q 30/06* (2012.01)

(52) U.S. Cl.
CPC ..... *G06F 21/6254* (2013.01); *G06Q 30/0635* (2013.01)

(58) Field of Classification Search
CPC .................................................. G06F 21/6254
USPC .......................................................... 705/26.8
See application file for complete search history.

(56) References Cited

U.S. PATENT DOCUMENTS

| | | | | |
|---|---|---|---|---|
| 7,222,087 B1* | 5/2007 | Bezos | ................... | G06Q 10/087 705/26.81 |
| 7,814,032 B2* | 10/2010 | Fitzsimmons | ....... | G06Q 10/107 705/1.1 |
| 7,818,268 B2* | 10/2010 | Fitzsimmons | ....... | G06Q 10/107 705/1.1 |
| 8,260,629 B2* | 9/2012 | Fitzsimmons | ....... | G06Q 10/107 705/1.1 |
| 8,429,093 B2* | 4/2013 | Fitzsimmons | ....... | G06Q 10/107 705/330 |
| 8,910,860 B2* | 12/2014 | Fitzsimmons | ....... | G06Q 10/107 235/375 |
| 9,105,002 B2* | 8/2015 | Fitzsimmons | ....... | G06Q 10/107 |
| 2006/0074774 A1* | 4/2006 | Estes | ..................... | G06Q 10/08 705/26.41 |
| 2009/0210347 A1* | 8/2009 | Sarcanin | ................ | G06Q 20/02 705/67 |
| 2012/0271712 A1* | 10/2012 | Katzin | .................... | G06Q 30/06 705/14.51 |
| 2012/0316992 A1* | 12/2012 | Oborne | .................. | G06Q 30/06 705/26.41 |
| 2013/0218721 A1* | 8/2013 | Borhan | ................ | G06Q 20/322 705/26.41 |

* cited by examiner

Primary Examiner — Alexis M Casey
(74) Attorney, Agent, or Firm — Eversheds Sutherland (US) LLP

(57) ABSTRACT

This disclosure describes systems, methods, and computer-readable media related to preserving customer data privacy for merchant orders. A purchase request may be received from a user device. The purchase request may be processed to identify user data, merchant data, and merchandise data. A privacy identifier associated with the purchase request may be generated. An intermediate processing center to receive requested merchandise may be determined based at least in part on the purchase request. Intermediate processing center data may be associated with the privacy identifier. The purchase request may be modified by removing at least a portion of the user data, and adding the privacy identifier. The modified purchase request may be transmitted to a merchant based at least in part on the merchant data.

20 Claims, 5 Drawing Sheets

PRESERVING CUSTOMER DATA PRIVACY FOR MERCHANT ORDERS

BACKGROUND

Online retailers may coordinate with multiple merchants to provide different types of products and/or services to customers. However, customer data privacy becomes increasingly vulnerable as many retailers collect and sell customer data. For example, merchants may collect addresses and contact information associated with customers and may sell the information to companies that use the information to distribute unsolicited mail or communications, which may be undesirable to the customers and/or the online retailers. Additionally, having multiple merchants interact directly with customers may prevent online retailers from monitoring or auditing the interaction between merchants and customers, which may have negative impacts. For example, if a customer uses an online retailer to purchase an item and interacts solely with the merchant, if a dispute arises between the merchant and the customers, the online retailer may not have visibility to any communications or problems between the parties and may not be able to provide any assistance, which may ultimately harm not only the reputation of the merchant but also the online retailer.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
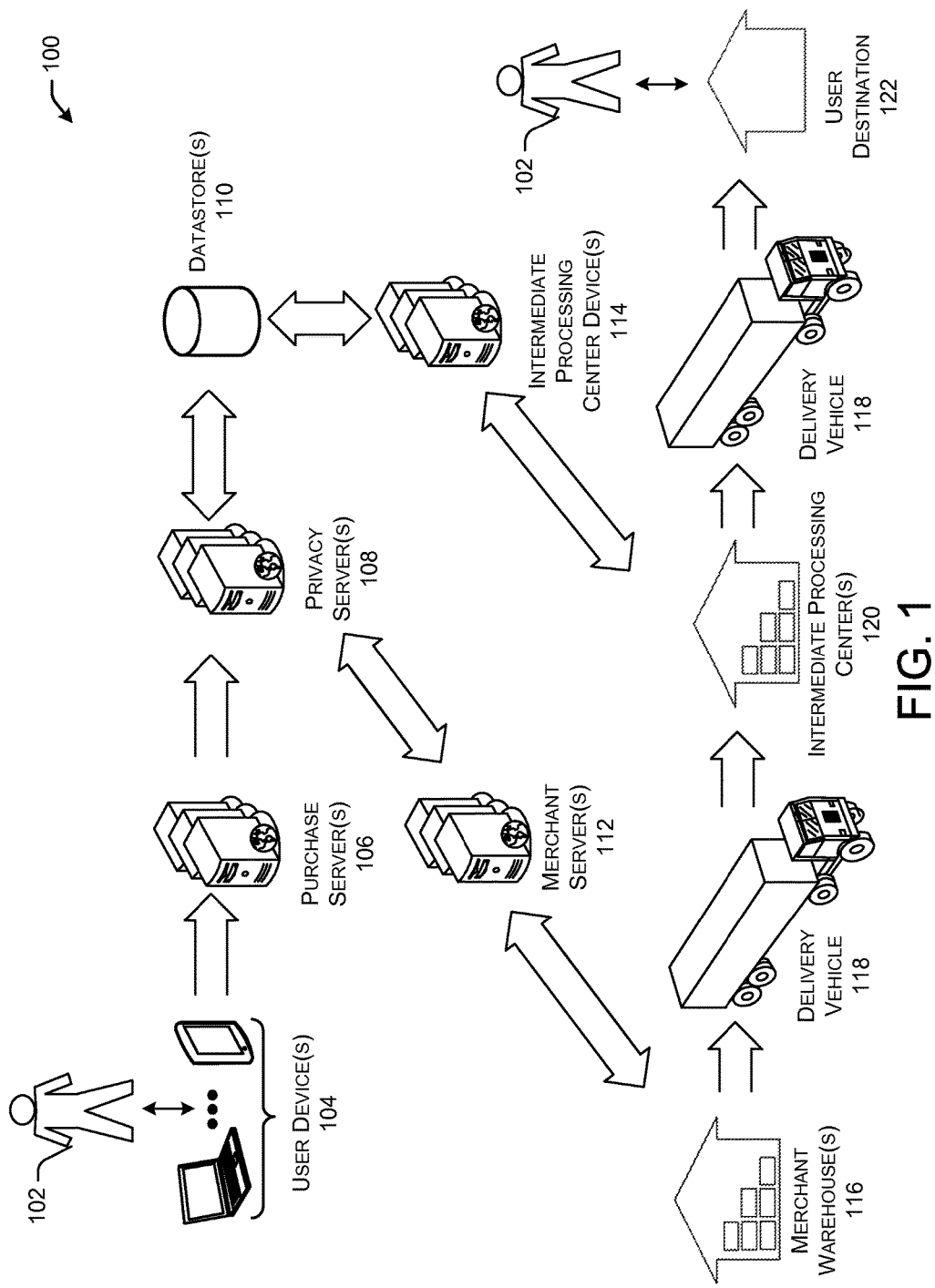
FIG. 1 depicts an illustrative data flow between various components of an illustrative system architecture for inventory management in accordance with one or more embodiments of the disclosure.

This disclosure relates to, among other things, systems, methods, computer-readable media, techniques, and methodology for preserving customer data privacy for merchant orders. Online retailers may wish to preserve the privacy of customers by obscuring customer information (e.g., customer name, address, contact information, etc.) from merchants. The methods and systems described herein may provide means for customer data to remain private while providing audit points for the online retailer to capture and measure data associated with the e-commerce system. For example, the audit points may provide data regarding how often merchants interact with customers, types of interactions, identification of any conflicts, timeliness of responses, and the like.

In some embodiments, a user may wish to purchase books from an online retailer. The online retailer may be associated with multiple merchants that have the specific books in inventory and are able to process the transaction. The user may operate a user device, such as a laptop, smartphone, tablet or the like, to submit a purchase request for the books. The purchase request may be submitted to a purchase server that processes the request. The purchase server may communicate with one or more privacy servers to facilitate the preservation of customer data privacy with merchants. The privacy server may generate a unique privacy identifier and associate the privacy identifier with the purchase request and/or data identified from the purchase request (e.g., customer data). The privacy identifier may also be associated with different types of information associated with customers and/or purchases. For example, the privacy identifier may be associated with one or more shipment speeds associated with a purchase request, the content of one or more packages associated with a purchase request, one or more payment methods (e.g., credit cards, debit cards, bank accounts) associated with a customer and/or purchase request, value added services (e.g., rewards points, etc.) or the like. The privacy identifier may be a unique identifier associated with customer data as well as an intermediate processing center (e.g., fulfillment center). The privacy server may identify an intermediate processing center (e.g., location to which the requested merchandise will be sent) based on different factors, such as proximity of the center from the delivery location specified by the customer, proximity of the center from the merchant, capability of the transport network, previous deliveries to the delivery location, merchant preference, and the like. The privacy server may then modify the purchase request to remove customer data or a portion of the customer data and replace it with the intermediate processing center data (e.g., address) and the privacy identifier. In some embodiments, the privacy server may generate a new message or notification that includes the merchandise information, privacy identifier, and the intermediate processing center data. The modified purchase request and/or new message/notification may be transmitted to a merchant server.

The merchant server may receive the modified purchase request and/or new message/notification and prepare a package with the requested merchandise for shipping. The merchant server may generate a shipping label based at least in part on the information received in the modified purchase request and/or new message/notification. For example, the shipping label may include the privacy identifier and be addressed to the intermediate processing center. The merchant may then facilitate transportation of the package to the intermediate processing center.

The intermediate processing center may receive and process the package. In some embodiments, a user at the intermediate processing center may obtain the privacy identifier from the package (e.g., from the shipping label). The privacy identifier may be obtained by scanning the shipping label (e.g., via a QR code reader, barcode reader, or the like) or by manually entering the privacy label using an intermediate processing center device. The intermediate processing center device may establish a connection with one or more datastores and may retrieve customer data based at least in part on the privacy identifier.

The intermediate processing center device may then facilitate generation of a new shipping label, removing the privacy identifier and using the customer data. In some embodiments, the new shipping label may remove the merchant information from the label and replace the information with the data associated with the intermediate processing center. The intermediate processing center device may then facilitate delivery of the package with the new shipping label to the location specified by the user in the purchase request.

In some embodiments, if the user wishes to return the merchandise, the user may submit a return request to the online retailer. The purchase server may facilitate transporting the merchandise from the user to the intermediate processing center. At the intermediate processing center, the intermediate processing center device may obtain customer information from the package (e.g., shipping label) and may retrieve a privacy identifier associated with the customer from one or more datastores. The intermediate processing center device may then facilitate generation of a new shipping label using the privacy label and merchant information, removing any customer data from the package and adding information associated with the online retailer and/or intermediate processing center. The intermediate processing center device may then facilitate transportation of the merchandise to the merchant.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Use Cases and System Architecture

FIG. 1 depicts an illustrative data flow between various components of an illustrative system architecture for preserving customer data privacy for merchant orders in accordance with one or more embodiments of the disclosure. One or more illustrative user device(s) 104 operable by one or more user(s) 102 are illustratively depicted in FIG. 1. The user device(s) 104 may include any suitable processor-driven computing device able to access, via a network, an e-commerce system (e.g., online retailer) via a web browser or dedicated application. The user device(s) 104 may be used to view and purchase merchandise and/or services. The user device(s) 104 may include any suitable processor-driven computing device including, but not limited to, a laptop computing device, a tablet device, a desktop computing device, smartphone or other cellular device, a gaming console, a multimedia content streaming device, a set-top box, and so forth. For ease of explanation, the user device(s) 104 and the user(s) 102 may be described herein in the singular; however, it should be appreciated that multiple user device(s) 104 operable by multiple users 102 may be provided.

The user device(s) 104 may generate and transmit a purchase request for merchandise to one or more purchase server(s) 106 of an e-commerce system. The purchase server(s) 106 may receive information from the user device 104. The purchase server(s) 106 may include any suitable processor-driven computing device including, but not limited to, a desktop computing device, a laptop computing device, a server, a smartphone, a tablet, and so forth. For ease of explanation, the purchase server(s) 106 may be described herein in the singular; however, it should be appreciated that multiple purchase server(s) 106 may be provided.

The purchase server(s) 106 may receive data from one or more user device(s) 104 and process the purchase request to identify customer data (e.g., customer identifier, name, address, contact information, payment information, and the like), merchant information (e.g., merchant identifier, merchant name, merchant address, merchant contact information, and the like), and merchandise information (e.g., quantity, brand, inventory status, delivery estimate, and the like). The purchase server(s) 106 may generate a notification and/or message containing data identified from the purchase request to one or more privacy server(s) 108.

The privacy server(s) 108 may receive the notification and/or message from the purchase server(s) 106. The privacy server(s) 108 may include any suitable processor-driven computing device including, but not limited to, a desktop computing device, a laptop computing device, a server, a smartphone, a tablet, and so forth. For ease of explanation, the privacy server(s) 108 may be described herein in the singular; however, it should be appreciated that multiple privacy server(s) 108 may be provided.

The privacy server(s) 108 may receive data from one or more purchase server(s) 106 and process the received data (e.g., message and/or notification) to identify customer data, merchant information, and merchandise information. The privacy server(s) 108 may generate a unique privacy identifier and associate the privacy identifier with at least a portion of the customer data. The privacy server(s) 108 may also identify an intermediate processing center to associate with the privacy identifier. In some embodiments the privacy server(s) 108 may identify the intermediate processing center by optimizing for multiple factors, such as proximity to the delivery location, capacity of transportation network, merchant preference with regards to pricing (e.g., whether merchant opted to pay the online retailer for delivery or whether the merchant will handle the logistics of the delivery themselves), and the like. The privacy server(s) 108 may associate the privacy identifier with the intermediate processing center.

For example, the privacy server(s) 108 may generate a mapping table to associate the unique privacy identifier with the customer data, merchant data, merchandise information, and/or intermediate processing center data. The privacy server(s) 108 may save the mapping table and associated information to one or more datastore(s) 110. The privacy server(s) 108 may then generate a message and/or notification to transmit to the merchant server(s) 112. In some embodiments, the message and/or notification is the purchase request with some modifications or edits. The message and/or notification may include merchant data, merchandise information, and intermediate processing center information. The privacy server(s) 108 may remove and/or omit a portion of the customer data (e.g., name, address and/or contact information) and add the privacy identifier.

The merchant server(s) 112 may receive the notification and/or message from the privacy server(s) 108. The merchant server(s) 112 may include any suitable processor-driven computing device including, but not limited to, a desktop computing device, a laptop computing device, a server, a smartphone, a tablet, and so forth. For ease of explanation, the merchant server(s) 112 may be described herein in the singular; however, it should be appreciated that multiple merchant server(s) 112 may be provided.

The merchant server(s) 112 may receive data from one or more privacy server(s) 108 and process the received data (e.g., message and/or notification). The merchant server(s) 112 may communicate with one or more merchant warehouse(s) 116 to facilitate preparation of the merchandise specified in the purchase request for shipping. The merchant server(s) 112 may facilitate generation of a shipping label using the intermediate processing center information (e.g., address, contact information, etc.) and include the privacy identifier. Workers at the merchant warehouse(s) 116 may prepare a package with the requested merchandise and shipping label and provide the package to a delivery vehicle 118. The delivery vehicle 118 may then transport the package to the intermediate processing center 120 indicated on the shipping label.

The intermediate processing center 120 may receive the one or more packages from the delivery vehicle 118. Workers at the intermediate processing center 120 may use an intermediate processing center device 114 to retrieve customer information based at least in part on the privacy identifier. The intermediate processing center device 114 may include any suitable processor-driven computing device including, but not limited to, a desktop computing device, a laptop computing device, a server, a smartphone, a tablet, and so forth. For ease of explanation, the intermediate processing center device 114 may be described herein in the singular; however, it should be appreciated that multiple intermediate processing center device 114 may be provided.

The intermediate processing center device 114 may obtain the privacy identifier from the package. In some embodiments, the privacy identifier may be scanned using a scanning device (e.g., QR code reader, barcode reader, etc.). In some embodiments, the privacy identifier may be manually entered by a user at the intermediate processing center 120. The intermediate processing center device 114 may establish a connection with one or more datastore(s) 110 and retrieve customer data based at least in part on the privacy identifier. The intermediate processing center device 114 may retrieve customer data (e.g., address or contact information) from the one or more datastore(s) 110. The intermediate processing center device 114 may then generate a new shipping label using the customer data and removing the privacy identifier and affix the shipping label to the package. In some embodiments, the intermediate processing center device 114 may also remove the merchant information and replace the merchant information with information associated with the intermediate processing center 120. The package with the new shipping label may then be provided to a delivery vehicle 118. The delivery vehicle may then transport the package and deliver the package to a user destination 122 (e.g., location specified by the user 102 in the purchase request) and/or other location associated with the user 102 for delivery.

Figure 2:
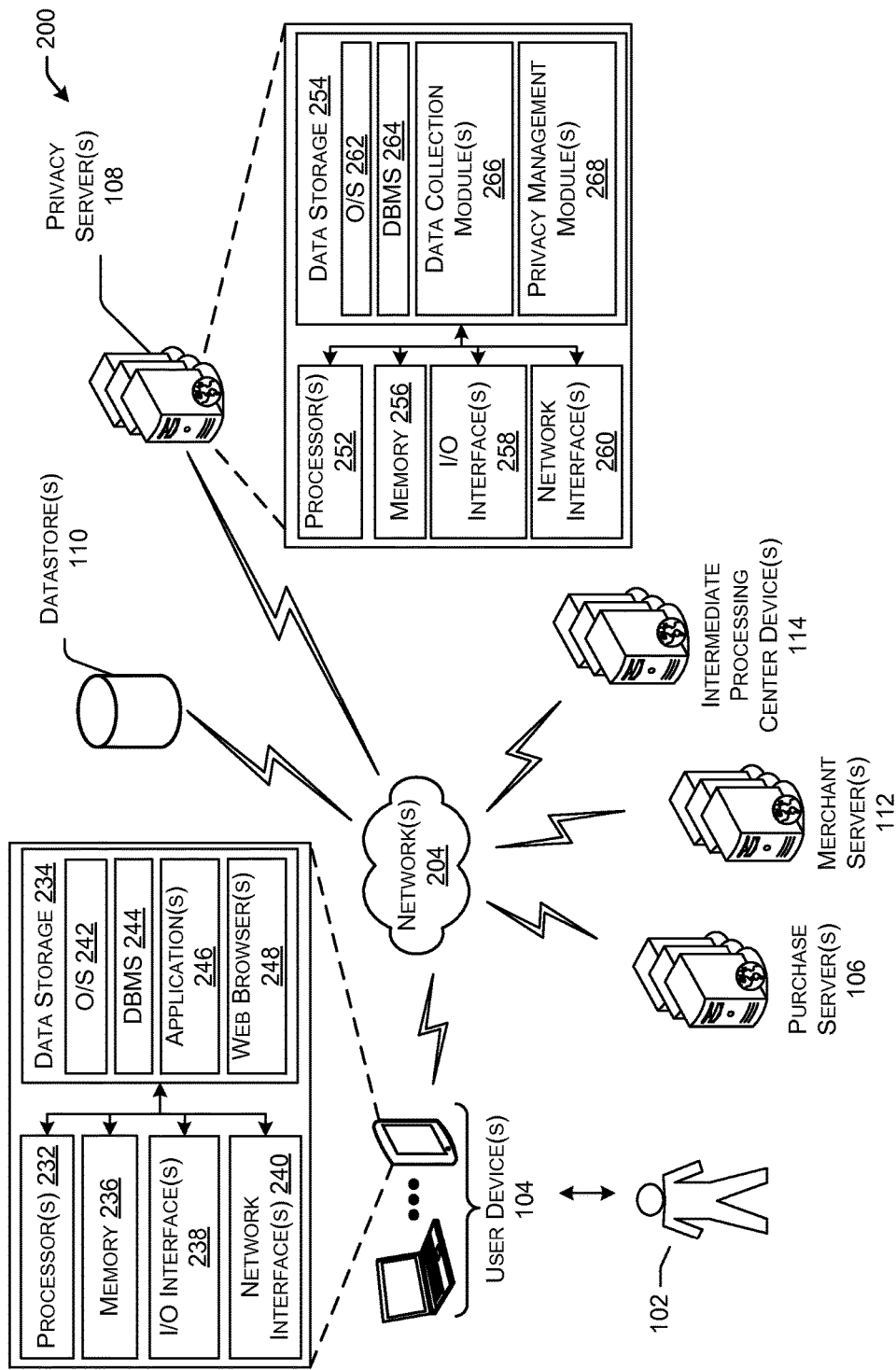
FIG. 2 is a block diagram including various hardware and software components of the illustrative system architecture depicted in FIG. 1 in accordance with one or more embodiments of the disclosure.

FIG. 2 is a block diagram including various hardware and software components of the illustrative system architecture depicted in FIG. 1 in accordance with one or more embodiments of the disclosure. The illustrative system architecture 200 may include one or more user device(s) 104 operable by one or more user(s) 102, one or more purchase server(s) 106, one or more privacy server(s) 108, one or more merchant server(s) 112, one or more intermediate processing center device(s) 114, and/or one or more datastore(s) 110. The user device(s) 104 purchase server(s) 106, privacy server(s) 108, merchant server(s) 112, intermediate processing center device(s) 114, and/or one or more datastore(s) 110 may include any of the types of devices described through reference to FIG. 1.

Any of the user device(s) 104 purchase server(s) 106, privacy server(s) 108, merchant server(s) 112, intermediate processing center device(s) 114, and/or one or more datastore(s) 110 may be configured to communicate with each other and any other component of the system architecture 200 via one or more network(s) 204. The network(s) 204 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 204 may have any suitable communication range associated therewith and may include, for example, global networks (e.g., the Internet), metropolitan area networks (MANs), wide area networks (WANs), local area networks (LANs), or personal area networks (PANs). In addition, the network(s) 204 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

The user device(s) 104 may include one or more processor(s) 232 and one or more memories 236 (referred to herein generically as memory 236). The processor(s) 232 may include any suitable processing unit capable of accepting data as input, processing the input data based on stored computer-executable instructions, and generating output data. The computer-executable instructions may be stored, for example, in the data storage 234 and may include, among other things, operating system software and application software. The computer-executable instructions may be retrieved from the data storage 234 and loaded into the memory 236 as needed for execution. The processor(s) 232 may be configured to execute the computer-executable instructions to cause various operations to be performed. The processor(s) 232 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 234 may store program instructions that are loadable and executable by the processor(s) 232, as well as data manipulated and generated by the processor(s) 232 during execution of the program instructions. The program instructions may be loaded into the memory 236 as needed for execution. Depending on the configuration and implementation of the user device(s) 104, the memory 236 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 236 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The user device(s) 104 may further include additional data storage 234 such as removable storage and/or non-removable storage including, but not limited to, magnetic storage, optical disk storage, and/or tape storage. Data storage 234 may provide non-volatile storage of computer-executable instructions and other data. The memory 236 and/or the data storage 234, removable and/or non-removable, are examples of computer-readable storage media (CRSM).

The user device(s) 104 may further include network interface(s) 240 that facilitate communication between the user device(s) 104 and other devices of the illustrative system architecture 200 (e.g., privacy server(s) 108, datastore(s) 110, etc.) or application software via the network(s) 204. The user device(s) 104 may additionally include one or more input/output (I/O) interfaces 238 (and optionally associated software components such as device drivers) that may support interaction between a user 102 and a variety of I/O devices, such as a keyboard, a mouse, a pen, a pointing device, a voice input device, a touch input device, a display, speakers, a camera, a microphone, a printer, and so forth.

Referring again to the data storage 234, various program modules, applications, or the like may be stored therein that may comprise computer-executable instructions that when executed by the processor(s) 232 cause various operations to be performed. The memory 236 may have loaded from the data storage 234 one or more operating systems (O/S) 242 that may provide an interface between other application software (e.g., dedicated applications, a browser application, a web-based application, a distributed client-server application, etc.) executing on the user device(s) 104 and the hardware resources of the user device(s) 104. More specifically, the O/S 242 may include a set of computer-executable instructions for managing the hardware resources of the user device(s) 104 and for providing common services to other application programs (e.g., managing memory allocation among various application programs). The O/S 242 may include any operating system now known or which may be developed in the future including, but not limited to, any mobile operating system, desktop or laptop operating system, mainframe operating system, or any other proprietary or open-source operating system.

The data storage 234 may further include one or more database management systems (DBMS) 244 for accessing, retrieving, storing, and/or manipulating data stored in one or more datastores (e.g., datastore 110). The DBMS 244 may use any of a variety of database models (e.g., relational model, object model, etc.) and may support any of a variety of query languages.

The data storage 234 may additionally include various other program modules that may include computer-executable instructions for supporting a variety of associated functionality. For example, the data storage 234 may include one or more application(s) 246 and/or one or more web browser(s) 248.

The application(s) 246 may include computer-executable instructions that in response to execution by the processor(s) 232 cause operations to be performed including providing functionality to request content from a server associated with an e-commerce system and receive the content therefrom for presentation to a user 102 of the user device 104. The user 102 may use a web browser 248 to access a webpage associated with an e-commerce system. In some embodiments, a user 102 may use an application 246 executing on the user device 104 to communicate with the e-commerce system to view and/or purchase merchandise or services provided by the e-commerce system.

The web browser(s) 248 may include computer-executable instructions that in response to execution by the processor(s) 232 cause operations to be performed including accessing and transmitting information via a network 204, such as accessing a web interface for an e-commerce system. The web browser 248 may be used to purchase merchandise or services from an e-commerce system.

Within the data storage 234, one or more modules may be stored. As used herein, the term module may refer to a functional collection of instructions that may be executed by the one or more processor(s) 232. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The privacy server(s) 108 may include one or more processor(s) 252 and one or more memories 256 (referred to herein generically as memory 256). The processor(s) 252 may include any suitable processing unit capable of accepting data as input, processing the input data based on stored computer-executable instructions, and generating output data. The computer-executable instructions may be stored, for example, in the data storage 254 and may include, among other things, operating system software and application software. The computer-executable instructions may be retrieved from the data storage 254 and loaded into the memory 256 as needed for execution. The processor(s) 252 may be configured to execute the computer-executable instructions to cause various operations to be performed. The processor(s) 252 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 254 may store program instructions that are loadable and executable by the processor(s) 252, as well as data manipulated and generated by the processor(s) 252 during execution of the program instructions. The program instructions may be loaded into the memory 256 as needed for execution. Depending on the configuration and implementation of the privacy server(s) 108, the memory 256 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 256 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The privacy server(s) 108 may further include additional data storage 254 such as removable storage and/or non-removable storage including, but not limited to, magnetic storage, optical disk storage, and/or tape storage. Data storage 254 may provide non-volatile storage of computer-executable instructions and other data. The memory 256 and/or the data storage 254, removable and/or non-removable, are examples of computer-readable storage media (CRSM).

The privacy server(s) 108 may further include network interface(s) 260 that facilitate communication between the merchant server(s) 112 and other devices of the illustrative system architecture 200 (e.g., user device(s) 104, datastore(s) 110, etc.) or application software via the network(s) 204. The privacy server(s) 108 may additionally include one or more input/output (I/O) interfaces 258 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 254, various program modules, applications, or the like may be stored therein that may comprise computer-executable instructions that when executed by the processor(s) 252 cause various operations to be performed. The memory 256 may have loaded from the data storage 254 one or more operating systems (O/S) 262 that may provide an interface between other application software (e.g., dedicated applications, a browser application, a web-based application, a distributed client-server application, etc.) executing on the privacy server(s) 108 and the hardware resources of the privacy server(s) 108. More specifically, the O/S 262 may include a set of computer-executable instructions for managing the hardware resources of the privacy server(s) 108 and for providing common services to other application programs (e.g., managing memory allocation among various application programs). The O/S 262 may include any operating system now known or which may be developed in the future including, but not limited to, any mobile operating system, desktop or laptop operating system, mainframe operating system, or any other proprietary or open-source operating system.

The data storage 254 may further include one or more database management systems (DBMS) 264 for accessing, retrieving, storing, and/or manipulating data stored in one or more datastores (e.g., datastore 110). The DBMS 264 may use any of a variety of database models (e.g., relational model, object model, etc.) and may support any of a variety of query languages.

The data storage 254 may additionally include various other program modules that may include computer-executable instructions for supporting a variety of associated functionality. For example, the data storage 254 may include one or more data collection module(s) 266 and/or one or more privacy management module(s) 268.

The data collection module(s) 266 may include computer-executable instructions that in response to execution by the processor(s) 252 cause operations to be performed including receiving data from one or more user device(s) 104. In some embodiments, the data collection module 266 may receive data from one or more user device(s) 104, such as data received from purchase requests originating from user device(s) 104.

The privacy management module(s) 268 may include computer-executable instructions that in response to execution by the processor(s) 252 cause operations to be performed including receive data from the data collection module 266 and analyze and/or process the data. In some embodiments, the privacy management module 268 may process the data to identify whether a privacy identifier associated with the user 102 exists, generating a privacy identifier if one does not exist, determining an intermediate processing center to receive the merchandise from the merchants, obtaining merchant information, and the like.

Within the data storage 254, one or more modules may be stored. As used herein, the term module may refer to a functional collection of instructions that may be executed by the one or more processor(s) 252. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

Those of ordinary skill in the art will appreciate that any of the components of the system architecture 200 may include alternate and/or additional hardware, software, or firmware components beyond those described or depicted without departing from the scope of the disclosure. More particularly, it should be appreciated that hardware, software, or firmware components depicted or described as forming part of any of the illustrative components of the system architecture 200, and the associated functionality that such components support, are merely illustrative and that some components may not be present or additional components may be provided in various embodiments. While various program modules have been depicted and described with respect to various illustrative components of the system architecture 200, it should be appreciated that the functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of hardware, software, and/or firmware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative system architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative system architecture 200, or additional functionality.

Illustrative Processes

Figure 3:
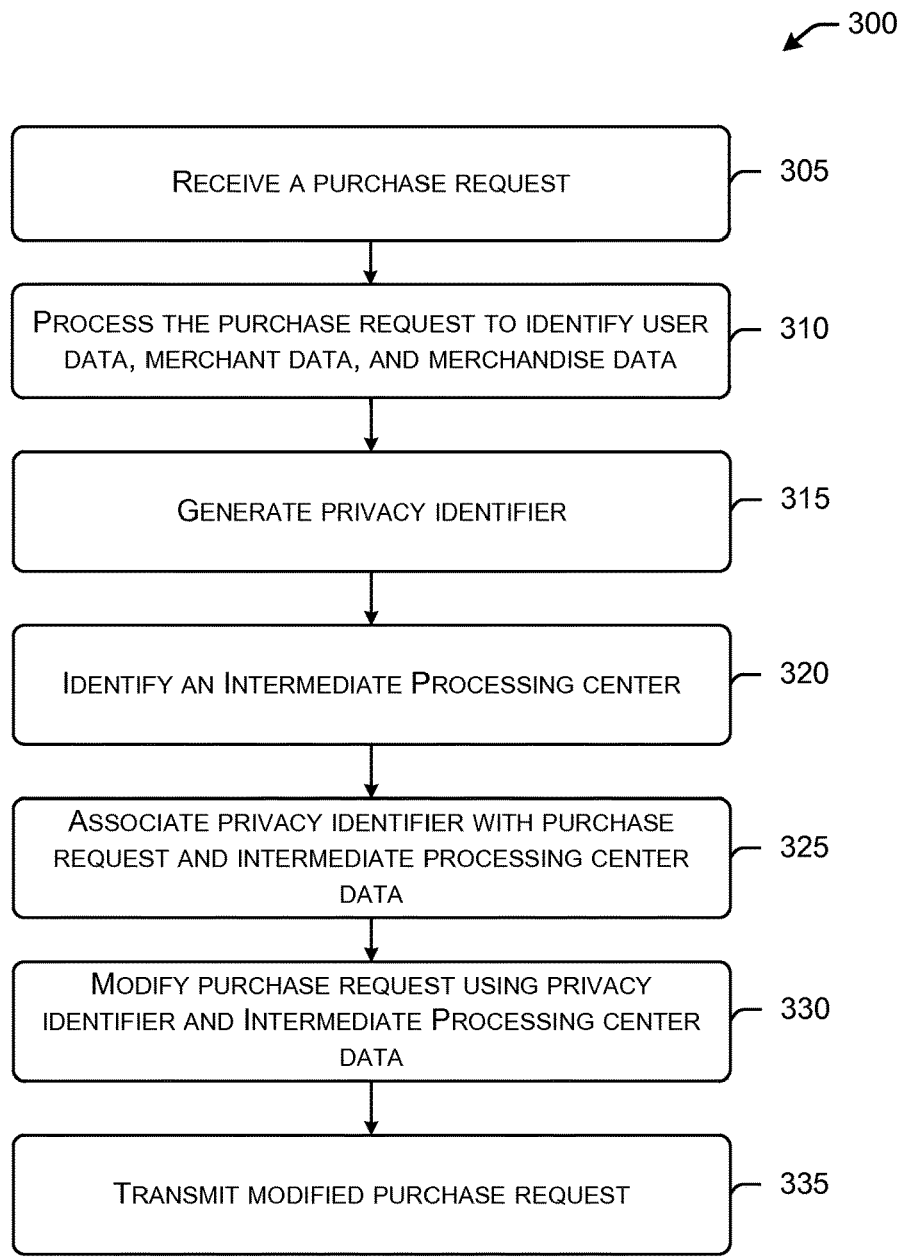
FIG. 3 is a process flow diagram of an illustrative method for preserving customer data privacy for merchant orders in accordance with one or more embodiments of the disclosure.

FIG. 3 is a process flow diagram of an illustrative method 300 for preserving customer data privacy for merchant orders in accordance with one or more embodiments of the disclosure. At block 305, a privacy server 108 may receive a purchase request. The purchase request may have been submitted by a user 102 via a user device 104. The purchase request may include information associated with the purchased merchandise (e.g., quantity, description, price, etc.), customer data (e.g., customer name, customer identifier, billing address, contact information, delivery location, payment method, etc.), and merchant data (e.g., merchant name, merchant identifier, merchant contact information, merchant location, etc.). The purchase request may have been transmitted from the user device 104 to a purchase server 106. The purchase server may have processed the purchase request and communicated with the privacy server 108. In some embodiments, the purchase server 106 may transmit the purchase request or a portion of the purchase request to the privacy server 108.

At block 310, the privacy server 108 may process the purchase request to identify user data, merchant data, and merchandise data. In some embodiments, the data collection module 266 may receive data from the purchase server 106. In some embodiments, the purchase server 106 may have stored the purchase request to a datastore 110 and transmitted a message to the privacy server 108 including the location of the purchase request. The data collection module 266 may retrieve the purchase request (or a portion of the purchase request) from the datastore 110. In some embodiments, the purchase server 106 may have transmitted the purchase request to the privacy server 108 for processing. The data collection module 266 may process the purchase request to identify data (e.g., customer data, merchant data, merchandise data etc.). The data collection module 266 may then transmit the data to the privacy management module 268.

At block 315, the privacy server 108 may generate a privacy identifier. The privacy management module 268 may receive data from the data collection module 266. The privacy management module 268, in some embodiments, may determine whether the identified customer data is associated with an existing privacy identifier. If so, the privacy management module 268 may retrieve the privacy identifier. If one does not exist, the privacy management module 268 may generate a unique privacy identifier. In some embodiments, the privacy identifier may be associated with a customer. In some embodiments, the privacy identifier may be a unique identifier that may be utilized for a pre-determined amount of time before being disassociated from a customer. For example, the privacy identifier may be an identifier that may be used for the customer for a period of a week. If a customer places a second order within that week, the same privacy identifier may be used. If the customer places a second order after the expiration of the week, a new privacy identifier may be generated.

At block 320, the privacy server 108 may identify an intermediate processing center. The privacy management module 268 may identify one or more intermediate processing centers based on a variety of different factors, which may include but are not limited to, capacity of the transportation network (e.g., operated by online retailer or a third party), proximity of the intermediate processing center from the delivery location specified by the customer in the purchase request (e.g., within a pre-determined distance, such as within 10 miles of the delivery location), merchant preference (e.g., whether the merchant would like to pay a fee to the online retailer to facilitate delivery of the merchandise to the customer), previous deliveries to the location, and the like. In some embodiments, the privacy management module 268 may determine a cost associated with delivering to one or more intermediate processing centers and identify the intermediate processing center from the one or more intermediate processing centers based at least in part on the determined cost (e.g., lowest cost).

At block 325, the privacy server 108 may associate the privacy identifier with the purchase request and intermediate processing center data. In some embodiments, the privacy management module may generate and maintain a mapping table or other similar tool to associate the privacy identifier, customer data, merchant information, intermediate processing center data, and the like. The privacy management module 268 may transmit the information to one or more datastores 110 for storage.

At block 330, the privacy server 108 may modify a purchase request using the privacy identifier and intermediate processing center data. In some embodiments, the privacy management module 268 may generate a new purchase request. The modified or new purchase request may include merchandise information, the privacy identifier, and intermediate processing center data. By removing customer information, the system may maintain the privacy of customer data from the merchants.

At block 335, the privacy server 108 may transmit the modified (or newly generated) purchase request to one or more merchant servers 112. The merchant servers 112 may receive the request and may prepare the merchandise for transportation to the intermediate processing center. The merchant server 112 may facilitate generation of a shipping label that includes the privacy identifier, intermediate processing center data (e.g., address and contact information) and provide the package for transportation to the intermediate processing center 120.

Figure 4:
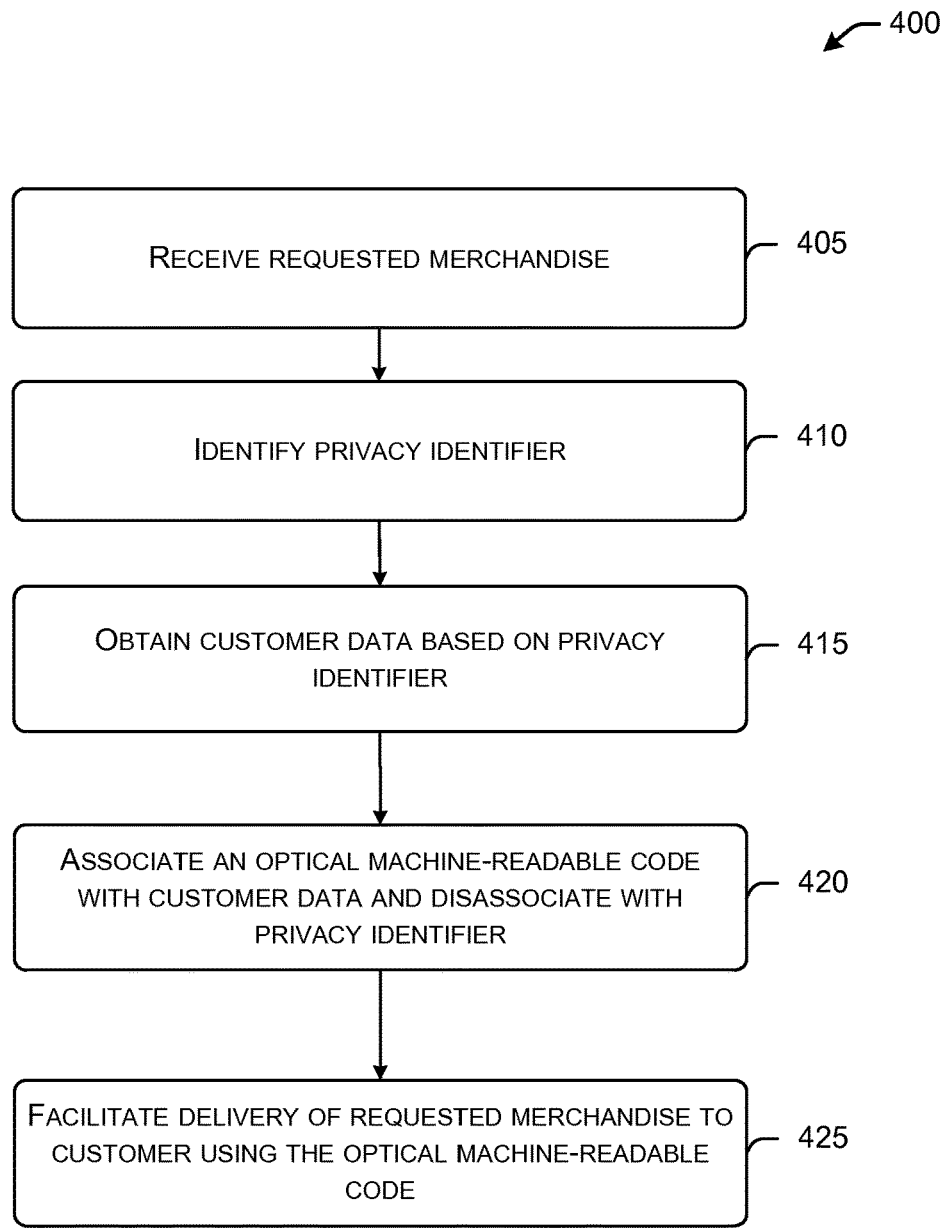
FIG. 4 is a process flow diagram of an illustrative method for facilitating delivery of merchandise while preserving customer data privacy for merchant orders in accordance with one or more embodiments of the disclosure.

FIG. 4 is a process flow diagram of an illustrative method 400 for facilitating delivery of merchandise while preserving customer data privacy for merchant orders in accordance with one or more embodiments of the disclosure. At block 405, the requested merchandise may be received at the intermediate processing center 120. The merchandise may be delivered from a merchant warehouse 116 by a delivery vehicle 118.

At block 410, the privacy identifier may be identified. In some embodiments, the privacy identifier may be associated with an optical machine-readable code, such as a barcode or QR code that is displayed on the shipping box of the merchandise. In some embodiments, the privacy identifier may be associated with non-optical tracking mechanism, such as an RFID tag, NFC tag, or the like. In some embodiments, a scanning device, such as a QR code reader, barcode reader, or the like, may obtain the privacy identifier from the optical machine-readable code affixed to the package (e.g., a shipping label affixed to the package) or from another location of the package. In some embodiments, the privacy identifier may be manually entered into an intermediate processing center device 114 by a user at the intermediate processing center 120.

At block 415, customer data may be obtained based at least in part on the privacy identifier. In some embodiments, an intermediate processing center device 114 may establish a connection over a network 204 with one or more datastores 110. The intermediate processing center device 114 may obtain customer data (e.g., customer name, address of delivery location, contact information, etc.) from the datastore(s) 110.

At block 420, the customer data may be associated with the optical machine-readable code and the privacy identifier may be disassociated from the optical machine-readable code so that the party delivering the package containing the merchandise may have access to the customer data when the optical machine-readable code is scanned, but does not have access to the privacy identifier when the optical machine-readable code is scanned.

In some alternative embodiments, a new shipping label may be prepared based at least in part on the customer data. The intermediate processing center device 114 may facilitate generation of a new shipping label based at least in part on the obtained customer data. The new shipping label may remove the privacy identifier and use the address of delivery location and contact information provided by the user 102 in the purchase request. In some embodiments, the intermediate processing center device 114 may remove merchant information from the shipping label and/or package and replace the information with information associated with the online retailer and/or intermediate processing center. By removing the merchant information, the user 102 will need to contact the online retailer rather than the merchant in order to address any conflicts or issues associated with the merchandise, which would provide an audit point for the online retailer to collect information and monitor the relationship with the user 102. The online retailer would effectively become the intermediary and would need to be involved in any communication between the user 102 and the merchant.

At block 425, delivery of the requested merchandise to the user 102 may be facilitated using the optical machine-readable code. A delivery vehicle 118 may receive the requested merchandise, scan the optical machine-readable code to obtain the delivery address of the merchandise, and facilitate the delivery of the merchandise to the user destination 122.

In some embodiments, delivery of the requested merchandise to the user 102 may be facilitated using the new shipping label. The intermediate processing center 120 may provide the requested merchandise with the new shipping label (e.g., including the customer data and removing the privacy identifier) to a delivery vehicle 118 which would transport the merchandise to the delivery location specified by the user 102 (e.g., user destination 122).

Figure 5:
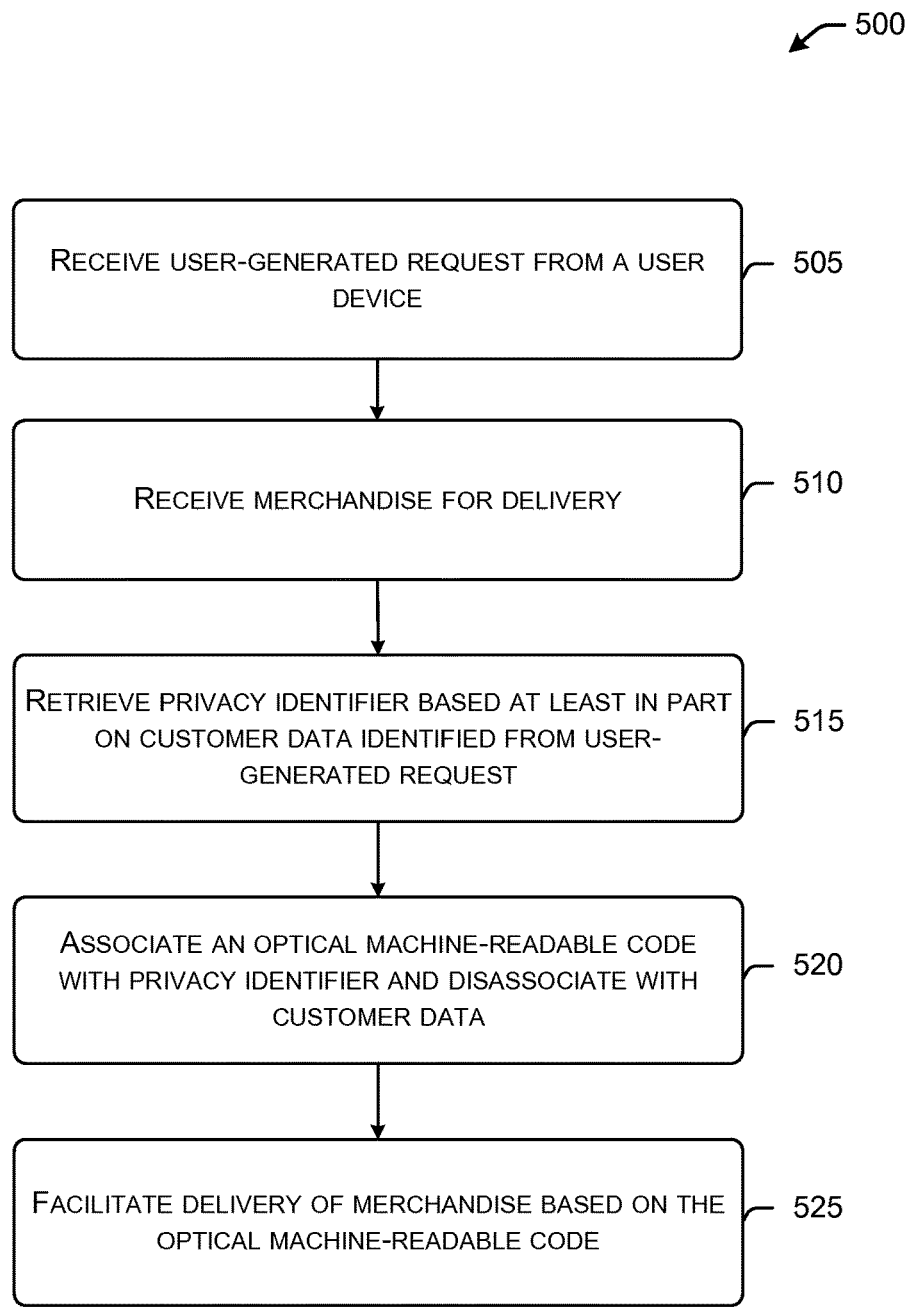
FIG. 5 is a process flow diagram of an illustrative method for facilitating delivery of merchandise for user-generated requests while preserving customer data privacy for merchant orders in accordance with one or more embodiments of the disclosure.

FIG. 5 is a process flow diagram of an illustrative method 500 for facilitating delivery of merchandise for user-generated requests while preserving customer data privacy for merchant orders in accordance with one or more embodiments of the disclosure. At block 505, the purchase server 106 may receive a user-generated request from a user device 104. For example, the user-generated request may be a request to return merchandise, a user-generated consignment transaction, a user-generated peer-to-peer transaction, such as an online auction transaction or online marketplace transaction, or the like. In some embodiments, the user-generated request may include an identifier associated with the purchase request. At block 510, an intermediate processing center may receive merchandise for delivery.

At block 515, an intermediate processing center device 114 may retrieve a privacy identifier based at least in part on customer data identified from the user-generated request. In some embodiments, the privacy identifier may be retrieved based on customer data (e.g., name, customer identifier associated with the e-commerce system, etc.) or from the identifier associated with the purchase request that may be included in the user-generated request. The intermediate processing center device 114 may establish a connection with one or more datastore(s) 110 and retrieve the privacy identifier associated with the user 102.

At block 520, an optical machine-readable code displayed on the packaging of the merchandise to be delivered may be associated with a privacy identifier and disassociated from customer data. When a merchant, delivery service, or other entity outside of the online retailer scans the optical machine-readable code, the customer data would not be available and instead only the privacy identifier would be able to be obtained from the scanning of the code.

In some embodiments, a new shipping label may be generated based at least in part on the privacy identifier. In some embodiments, the intermediate processing center device 114 may facilitate generation of a new shipping label. The new shipping label may not include some or all customer data (e.g., may include name, but not contact information or may not include any information associated with the user 102). Instead, the shipping label may include the intermediate processing center information (e.g., address and/or contact information) and a privacy identifier. The privacy identifier may be utilized by the merchant to identify the appropriate purchase request to facilitate delivery of the merchandise. At block 525, delivery of the merchandise to the merchant may be facilitated.

In some embodiments, the systems and methods described herein may provide a mechanism to collect data at various audit points in the system 200. For example, data may be collected from the purchase server 106, privacy server 108, and other devices in the system 200 to collect data associated with purchases, contact between the user 102 and the online retailer and/or merchant. In some embodiments, metrics may be generated based on the information collected. For example, metrics may indicate the number of purchase requests generated by a user 102 in association with a particular privacy identifier, the number of communications between the various parties, the frequency and type of purchases and/or returns, and the like. The data collected and metrics generated may be stored in one or more datastore(s) 110 and may be used to generate a report. The report may be generated and transmitted in the form of an email or other communication or may be presented via a web interface. In some embodiments, the reports may be used to validate merchant performance (e.g., check when merchandise was actually shipped versus when the merchant reported the shipping, check listing of shipped merchandise against a listing of requested merchandise, reconcile payment amounts and types, audit response times to customer inquiries, or the like), contact a customer with one or more status updates associated with the purchase request (e.g., availability of merchandise, speed of merchandise shipment, current location of shipment, or the like), or reconcile a listing of merchandise associated with the purchase request and a listing of merchandise shipped to the customer.

Conclusion

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a non-transitory computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A non-transitory computer-readable medium storing computer-executable instructions which, when executed by a processor, cause the processor to perform operations comprising:

receiving, from a user device, a purchase request for merchandise;

processing the purchase request to identify user data, merchant data, and merchandise data;

generating a privacy identifier associated with the user data of the purchase request;

determining a processing center to receive the requested merchandise on behalf of a user account associated with the user data, based at least in part on the purchase request;

determining that processing center data is associated with the privacy identifier;

modifying the purchase request, wherein the modifying comprises removing at least a portion of the user data, and adding the privacy identifier;

transmitting the modified purchase request based at least in part on the merchant data;

determining that a package containing the requested merchandise and having a first label affixed thereto was received at the processing center, wherein the first label comprises first optical machine-readable code, and wherein the first optical machine-readable code comprises the privacy identifier and the processing center data;

determining the privacy identifier from the first label;

retrieving the user data based at least in part on the privacy identifier determined from the first label; and generating, based at least in part on the retrieved user data, a second label for affixing to the package containing the requested merchandise, wherein the second label comprises second optical machine-readable code, and wherein the privacy identifier is absent from the second optical machine-readable code.

2. The non-transitory computer-readable medium of claim 1, wherein the computer-executable instructions further include instructions which, when executed by the processor, cause the processor to perform further operations comprising:

transmitting the second label and the package to a delivery vehicle.

3. The non-transitory computer-readable medium of claim 1, wherein the privacy identifier is valid for a pre-determined time period and is disassociated from the purchase request upon expiration of the pre-determined time period.

4. The non-transitory computer-readable medium of claim 1, wherein the computer-executable instructions further include instructions which, when executed by the processor, cause the processor to perform further operations comprising:

analyzing the user data to determine a location to deliver the requested merchandise;

identifying one or more processing centers within a pre-determined distance from the location; and selecting the processing center from the one or more identified processing centers to receive the requested merchandise based at least in part on one or more of a capacity associated with a transportation network, previous deliveries to a location specified in the purchase request, proximity to the location specified in the purchase request, a merchant location, or merchant preference.

5. A computer-implemented method comprising:

receiving, by one or more processors of a computing device, a purchase request comprising user data, merchant data, and merchandise data;

generating, by the one or more processors, an identifier;

determining, by the one or more processors, that the identifier is associated with the user data;

determining, by the one or more processors, a processing center to receive requested merchandise on behalf of a user account associated with the user data based at least in part on the purchase request;

determining, by the one or more processors, that processing center data is associated with the identifier;

generating, by the one or more processors, a message comprising the merchant data, the merchandise data, and the identifier;

transmitting, by the one or more processors, the message based at least in part on the merchant data;

determining, by the one or more processors, that a package containing the requested merchandise and having a first label was received at the processing center from the merchant, wherein the first label comprises first optical machine-readable code, and wherein the first optical machine-readable code comprises the identifier and the processing center data;

determining, by the one or more processors, the identifier from the first label of the package;

retrieving, by the one or more processors, the user data based at least in part on the identifier determined from the first label; and generating, by the one or more processors and based at least in part on the retrieved user data, a second label for affixing to the package containing the requested merchandise, wherein the second label comprises second optical machine-readable code, and wherein the identifier is not included in the second optical machine-readable code.

6. The computer-implemented method of claim 5, wherein the identifier is associated with the user account.

7. The computer-implemented method of claim 5, wherein the identifier is valid for a pre-determined time period and is disassociated from the purchase request upon expiration of the pre-determined time period.

8. The computer-implemented method of claim 5, further comprising:
generating, by the one or more processors, a mapping table comprising the identifier, the user data, the merchant data, the merchandise data, and the processing center data; and
transmitting, by the one or more processors, the mapping table to one or more datastores.

9. The computer-implemented method of claim 5, further comprising:
transmitting the package and the second label to a delivery vehicle.

10. The computer-implemented method of claim 5, further comprising:
identifying one or more processing centers; and
selecting the processing center from the one or more processing centers based at least in part on one or more of a capacity associated with a transportation network, previous deliveries to a location specified in the purchase request, proximity to the location specified in the purchase request, a merchant location, or merchant preference.

11. The computer-implemented method of claim 10, further comprising:
determining a cost associated with delivering to one or more processing centers; and
identifying the processing center from the one or more processing centers based at least in part on the determined cost.

12. The computer-implemented method of claim 5, further comprising:
obtaining, by the one or more processors, data associated with the purchase request from one or more devices;
analyzing, by the one or more processors, the data;
generating, by the one or more processors, a report based at least in part on the data; and
initiating one or more actions based at least in part on the report, wherein the one or more actions comprise validating merchant performance, contacting a user with one or more status updates associated with the purchase request, or reconciling a listing of merchandise associated with the purchase request and a listing of merchandise shipped to the user.

13. The computer-implemented method of claim 12, wherein the data comprises one or more of a number of purchases associated with the identifier, type of merchandise of the purchase request, quantity of merchandise in the purchase request, number of communications between a merchant and the user in association with the purchase request, or type of communication between the merchant and the user in association with the purchase request.

14. The computer-implemented method of claim 5, further comprising:
receiving, by the one or more processors, a user-generated request from a user device, wherein the user-generated request is associated with the requested merchandise;
retrieving, by the one or more processors, the identifier and the merchant data based at least in part on the user-generated request; and
generating, by the one or more processors, a third label based at least in part on the identifier and the merchant data.

15. A system comprising:
at least one memory storing computer-executable instructions; and
at least one processor, wherein the at least one processor is configured to access the at least one memory and to execute the computer-executable instructions to:
receive a purchase request;
process the purchase request to identify user data, merchant data, and merchandise data;
generate a unique identifier;
determine that the unique identifier is associated with the user data of the purchase request;
identify a processing center to receive requested merchandise on behalf of a user account associated with the user data;
determine that processing center data is associated with the unique identifier;
modify the purchase request to remove at least a portion of the user data and add the unique identifier;
transmit the modified purchase request based at least in part on the merchant data;
determine that a package containing the requested merchandise and having a first label was received at the processing center, wherein the first label comprises first optical machine-readable code, and wherein the first optical machine-readable code comprises the unique identifier and the processing center data;
determine the unique identifier from the first label;
retrieve the user data based at least in part on the unique identifier determined from the first label; and
generate, based at least in part on the retrieved user data, a second label for affixing to the package containing the requested merchandise, wherein the second label comprises second optical machine-readable code, and wherein the unique identifier is absent from the second optical machine-readable code.

16. The system of claim 15, wherein the at least one processor is configured to access the at least one memory and to further execute the computer-executable instructions to:

transmit the package containing the requested merchandise and the second label to a delivery vehicle.

17. The system of claim 15, wherein the at least one processor is configured to access the at least one memory and to further execute the computer-executable instructions to:

generate a mapping table comprising the unique identifier, the user data, the merchant data, the merchandise data, and the processing center data; and transmit the mapping table to one or more datastores.

18. The system of claim 15, wherein the unique identifier is valid for a pre-determined time period and is disassociated from the purchase request upon expiration of the pre-determined time period.

19. The system of claim 15, wherein the at least one processor is configured to access the at least one memory and to further execute the computer-executable instructions to:

receive a user-generated request from a user device, wherein the user-generated request is associated with the requested merchandise;

retrieve the unique identifier and the merchant data based at least in part on the user-generated request; and generate a third label for affixing to the package, wherein the third label is generated based at least in part on the unique identifier and the merchant data.

20. The system of claim 15, wherein the at least one processor is configured to access the at least one memory and to further execute the computer-executable instructions to:

identify one or more processing centers; and select the processing center from the one or more processing centers based at least in part on one or more of a capacity associated with a transportation network, previous deliveries to a location specified in the purchase request, proximity to the location specified in the purchase request, proximity to a merchant location, or merchant preference.

* * * * *